(12) United States Patent
Yang et al.

(10) Patent No.: US 12,361,603 B2
(45) Date of Patent: Jul. 15, 2025

(54) ASYNCHRONOUS RENDERING METHOD AND APPARATUS, DEVICE AND STORAGE MEDIUM

(71) Applicant: Beijing Volcano Engine Technology Co., Ltd., Beijing (CN)

(72) Inventors: Wenhai Yang, Beijing (CN); Xinyu Zhou, Beijing (CN); Xuan Luo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/743,504

(22) Filed: Jun. 14, 2024

(65) Prior Publication Data

US 2024/0420381 A1    Dec. 19, 2024

(30) Foreign Application Priority Data

Jun. 14, 2023   (CN) .......................... 202310707167.0

(51) Int. Cl.
*G06T 11/00* (2006.01)
*G06T 15/20* (2011.01)

(52) U.S. Cl.
CPC .......... *G06T 11/00* (2013.01); *G06T 2200/24* (2013.01)

(58) Field of Classification Search
CPC .......................... G06T 11/00; G06T 2200/24
See application file for complete search history.

(56) References Cited

U.S. PATENT DOCUMENTS

| | | | | |
|---|---|---|---|---|
| 2015/0026566 A1* | 1/2015 | Hui | ........................ | G06F 16/957 715/240 |
| 2018/0349151 A1* | 12/2018 | Hagedorn | ............. | G06F 9/4881 |
| 2021/0248805 A1* | 8/2021 | Jesus | ........................ | G06T 15/00 |

FOREIGN PATENT DOCUMENTS

| | | |
|---|---|---|
| CN | 109508434 A | 3/2019 |
| CN | 112562055 A | 3/2021 |
| CN | 112906087 A | 6/2021 |
| CN | 114066714 A | 2/2022 |

(Continued)

OTHER PUBLICATIONS

Extended European Search Report for European Application No. 24181925.9, mailed Dec. 9, 2024, 10 pages.

(Continued)

*Primary Examiner* — Yi Yang

(57) ABSTRACT

The present disclosure provides an asynchronous rendering method and apparatus, a device and a storage medium. The asynchronous rendering method is applied to a rendering engine, the rendering engine includes a synchronous rendering process and an asynchronous rendering process. The method includes: grouping primitives in an interface to be rendered to a plurality of primitive groups based on functions corresponding to each primitive of the primitives; determining rendering flags corresponding to each of the plurality of primitive groups, wherein the rendering flags include a synchronous rendering flag and an asynchronous rendering flag; and rendering primitive groups based on the rendering flags corresponding to each of the plurality of primitive groups, wherein a primitive group with the synchronous rendering flag is rendered by the synchronous rendering process, and a primitive group with the asynchronous rendering flag is rendered by the asynchronous rendering process.

14 Claims, 3 Drawing Sheets

(56) References Cited

FOREIGN PATENT DOCUMENTS

| | | |
|---|---|---|
| CN | 115439441 A | 12/2022 |
| WO | 2018113396 A1 | 6/2018 |

OTHER PUBLICATIONS

First Office Action for Chinese Application No. 202310707167.0, mailed May 12, 2025, 22 Pages.

\* cited by examiner

ASYNCHRONOUS RENDERING METHOD AND APPARATUS, DEVICE AND STORAGE MEDIUM

CROSS-REFERENCE TO RELATED APPLICATIONS

This application claims the priority to and benefits of the Chinese Patent Application, No. 202310707167.0, which was filed on Jun. 14, 2023. The aforementioned patent application is hereby incorporated by reference in its entireties.

TECHNICAL FIELD

The present disclosure relates to an asynchronous rendering method and apparatus, a device and a storage medium.

BACKGROUND

Interface rendering refers to the process of generating frames from an application and displaying them on a screen interface. To facilitate smooth user interaction with the application, it is usually ensured that each frame is rendered within 16 milliseconds, so as to achieve a rendering speed of 60 frames per second. In existing big data scenarios, rendering interfaces after data processing often leads to rendering blockage and prolonged white screen occurrences due to the large volume of data processed, causing rendering time to be too long and affecting the user experience.

SUMMARY

In view of this, the present disclosure provides an asynchronous rendering method and apparatus, a device, and a storage medium to improve the speed of interface rendering and enhance user experience.

To achieve the above objectives, the technical solution provided in the present disclosure is as follows:

In a first aspect of the present disclosure, an asynchronous rendering method is provided. The method according to the present disclosure is applied to a rendering engine, which includes a synchronous rendering process and an asynchronous rendering process, and the method includes:
 grouping primitives in an interface to be rendered to a plurality of primitive groups based on functions corresponding to each primitive of the primitives;
 determining rendering flags corresponding to each of the plurality of primitive groups, wherein the rendering flags include a synchronous rendering flag and an asynchronous rendering flag; and
 performing rendering based on the rendering flags corresponding to each of the plurality of primitive groups, wherein a primitive group with the synchronous rendering flag is rendered by the synchronous rendering process, and a primitive group with the asynchronous rendering flag is rendered by the asynchronous rendering process.

In an alternative implementation, the performing rendering based on the rendering flags corresponding to each of the plurality of primitive groups includes:
 determining rendering levels corresponding to each of the plurality of primitive groups; and
 performing rendering based on the rendering levels and the rendering flags corresponding to each of the plurality of primitive groups.

In an alternative implementation, the performing rendering based on the rendering levels and the rendering flags corresponding to each of the plurality of primitive groups includes:
 sorting the plurality of primitive groups based on the rendering levels corresponding to each of the plurality of primitive groups to obtain a plurality of sorted primitive groups;
 for a first primitive group with a lowest rendering level among the plurality of sorted primitive groups, in response to the first primitive group including the synchronous rendering flag, rendering the first primitive group by a first layer created by the synchronous rendering process, and in response to the first primitive group including the asynchronous rendering flag, rendering the first primitive group by a second layer created by the asynchronous rendering process; and
 for a second primitive group with a second lowest rendering level among the plurality of sorted primitive groups, in response to the second primitive group including the synchronous rendering flag, rendering the second primitive group by the synchronous rendering process and the first layer, and in response to the second primitive group including the asynchronous rendering flag, rendering the second primitive group by a third layer created by the asynchronous rendering process; and so on until the plurality of sorted primitive groups are all rendered.

In an alternative implementation, the method according to the present disclosure further includes:
 creating a new primitive group corresponding to the target primitive in response to an operation by a user on a target primitive in the interface to be rendered; and
 rendering the new primitive group by the asynchronous rendering process.

In an alternative implementation, the rendering the new primitive group by the asynchronous rendering process includes:
 adding the asynchronous rendering flag for the new primitive group; and
 rendering the new primitive group by a new layer created by the asynchronous rendering process in response to the asynchronous rendering process finishing rendering a currently rendered primitive group.

In an alternative implementation, the method according to the present disclosure further includes:
 creating an updated primitive group corresponding to an updated primitive in response to a primitive updating operation on the interface to be rendered; and
 rendering the updated primitive group in response to the interface to be rendered completing a first time of rendering.

In an alternative implementation, the rendering the updated primitive group in response to the interface to be rendered completing a first time of rendering includes:
 adding a rendering flag for the updated primitive group; and
 in response to the interface to be rendered completing the first time of rendering and the updated primitive group including the synchronous rendering flag, rendering the updated primitive group by the synchronous rendering process and the first layer; and in response to the interface to be rendered completing the first time of rendering and the updated primitive group including the asynchronous rendering flag, rendering the updated primitive group by a new layer created by the asynchronous rendering process.

In a second aspect of the present disclosure, an asynchronous rendering apparatus is provided. the apparatus according to the present disclosure is applied to a rendering engine, the rendering engine includes a synchronous rendering process and an asynchronous rendering process, and the apparatus includes:

a grouping circuit, configured to group primitives in an interface to be rendered to a plurality of primitive groups based on functions corresponding to each primitive of the primitives;

a determining circuit, configured to determine rendering flags corresponding to each of the plurality of primitive groups, wherein the rendering flags include a synchronous rendering flag and an asynchronous rendering flag; and a rendering circuit, configured to perform rendering based on the rendering flags corresponding to each of the plurality of primitive groups, wherein a primitive group with the synchronous rendering flag is rendered by the synchronous rendering process, and a primitive group with the asynchronous rendering flag is rendered by the asynchronous rendering process.

In an alternative implementation, the rendering circuit is configured to: determine rendering levels corresponding to each of the plurality of primitive groups; and preform rendering based on the rendering levels and the rendering flags corresponding to each of the plurality of primitive groups.

In an alternative implementation, the rendering circuit is configured to: sort the plurality of primitive groups based on the rendering levels corresponding to each of the plurality of primitive groups to obtain a plurality of sorted primitive groups; for a first primitive group with a lowest rendering level among the plurality of sorted primitive groups, in response to the first primitive group including the synchronous rendering flag, render the first primitive group by a first layer created by the synchronous rendering process, and in response to the first primitive group including the asynchronous rendering flag, render the first primitive group by a second layer created by the asynchronous rendering process; and for a second primitive group with a second lowest rendering level among the plurality of sorted primitive groups, in response to the second primitive group including the synchronous rendering flag, render the second primitive group by the synchronous rendering process and the first layer, and in response to the second primitive group including the asynchronous rendering flag, render the second primitive group by a third layer created by the asynchronous rendering process; and so on until the plurality of sorted primitive groups are all rendered.

In an alternative implementation, the grouping circuit is further configured to: create a new primitive group corresponding to the target primitive in response to an operation by a user on a target primitive in the interface to be rendered; and the rendering circuit is configured to: render the new primitive group by the asynchronous rendering process.

In an alternative implementation, the rendering circuit is configured to: add the asynchronous rendering flag for the new primitive group; and render the new primitive group by a new layer created by the asynchronous rendering process in response to the asynchronous rendering process finishing rendering a currently rendered primitive group.

In an alternative implementation, the grouping circuit is further configured to: create an updated primitive group corresponding to an updated primitive in response to a primitive updating operation on the interface to be rendered; and the rendering circuit is further configured to: render the updated primitive group in response to the interface to be rendered completing a first time of rendering.

In an alternative implementation, the rendering circuit is configured to: add a rendering flag for the updated primitive group; and in response to the interface to be rendered completing the first time of rendering and the updated primitive group including the synchronous rendering flag, render the updated primitive group by the synchronous rendering process and the first layer; and in response to the interface to be rendered completing the first time of rendering and the updated primitive group including the asynchronous rendering flag, render the updated primitive group by a new layer created by the asynchronous rendering process.

In a third aspect of the present disclosure, an electronic device is provided. The electronic device according to the present disclosure includes a processor and a memory, the memory is configured to store instructions or computer programs; and the processor is configured to execute the instructions or computer programs in the memory to cause the electronic device to execute the method according to the first aspect of the present disclosure.

In a fourth aspect of the present disclosure, a computer-readable storage medium is provided. The computer-readable storage medium has instructions stored thereon, wherein the instructions, when run on a device, cause the device to execute the method according to the first aspect of the present disclosure.

In a fifth aspect of the present disclosure, a computer program product is provided. The computer program product includes computer programs/instructions that implement the method according to the first aspect of the present disclosure when executed by a processor.

BRIEF DESCRIPTION OF DRAWINGS

In order to provide a clearer explanation of the embodiments or technical solutions in the present disclosure or prior art, a brief introduction will be made to the accompanying drawings required in the embodiments or prior art description. It is evident that the accompanying drawings in the following description are only some of the embodiments described in the present application. For those skilled in the art, other accompanying drawings can be obtained based on these drawings without inventive efforts.

DETAILED DESCRIPTION

In order to facilitate a better understanding of the present disclosure by those skilled in the art, the following will provide a clear and complete description of the technical solution in the present disclosure in conjunction with the accompanying drawings. Obviously, the described embodiments are only a part of the present disclosure, not the entire embodiments. Based on the embodiments herein, other embodiments obtained by ordinary technical personnel in this field without inventive efforts fall within the protection scope of the present disclosure.

In existing big data scenarios, rendering interfaces after data processing often leads to rendering blockage and prolonged white screen occurrences due to the large volume of data processed, causing rendering time to be too long and affecting the user experience.

Based on this, the embodiments of the present disclosure provide an asynchronous rendering method, so as to improve the interface rendering speed and enhance the user experience. In the concrete implementation, before rendering an interface to be rendered, based on functions corresponding to each primitive in the interface to be rendered, the primitives are grouped to obtain a plurality of primitive groups; then rendering flags corresponding to each of the plurality of primitive groups are determined, the rendering flags including a synchronous rendering flag and an asynchronous rendering flag; and rendering is performed based on the rendering flags corresponding to each of the primitive groups. Primitive groups with the synchronous rendering flag are rendered by the synchronous rendering process, and primitive groups with the asynchronous rendering flag are rendered by the asynchronous rendering process. That is, through the asynchronous rendering method provided by the present disclosure, the primitives of the interface to be rendered can be grouped, and rendering processes, both synchronous and asynchronous, that do not interfere with each other can be utilized to render the primitive groups with corresponding rendering flags, thereby improving the interface rendering speed and enhancing the user experience.

In order to facilitate the understanding of the technical scheme provided by the embodiments of the present disclosure, a detailed introduction will be made below with reference to the accompanying drawings.

Figure 1:
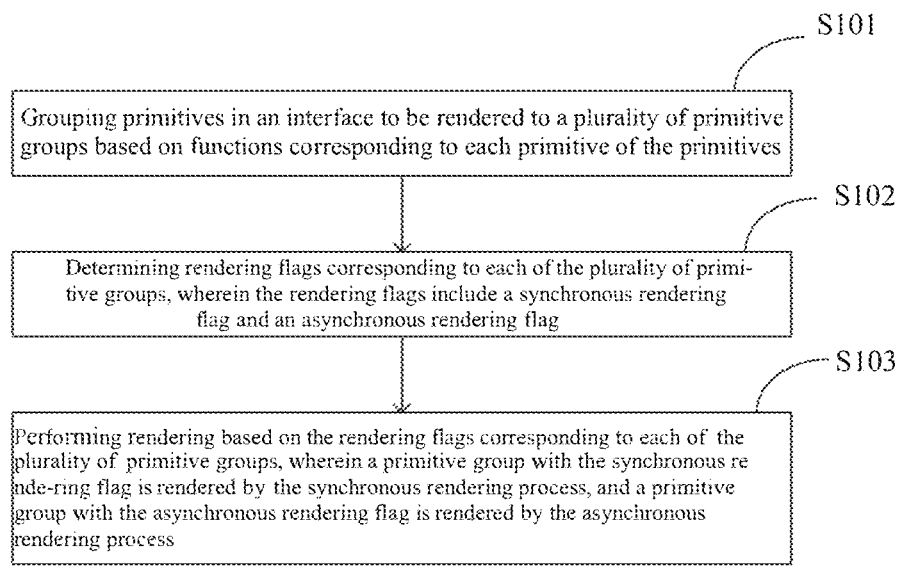
FIG. 1 is a flow diagram of an asynchronous rendering method according to embodiments of the present disclosure.

Refer to FIG. 1 which is a flow diagram of an asynchronous rendering method according to embodiments of the present disclosure.

The method can be executed by a rendering engine, which can be deployed in a terminal device or a server. The terminal includes but not limited to a desktop, a laptop, a tablet and a smart phone. The server can be a cloud server in a cloud environment, such as a central server in a central cloud computing cluster or an edge server in an edge cloud computing cluster. It should also be noted that the server can be a single server or a server cluster formed by multiple servers.

The rendering engine can include a synchronous rendering process and an asynchronous rendering process, that is, in order to realize asynchronous rendering, the rendering engine can create two processes for rendering. The synchronous rendering process can render primitives that need synchronous rendering, the asynchronous rendering process can render primitives that need asynchronous rendering, and the synchronous rendering process and the asynchronous rendering process do not affect each other. For example, when the synchronous rendering process is rendering a primitive (or primitive group), if the rendering engine detects that the next primitive (primitive group) that needs to be rendered requires asynchronous rendering, this next primitive (primitive group) can be assigned to the asynchronous rendering process for rendering without affecting the synchronous rendering process.

Specifically, the method according to the present disclosure includes the following steps.

In S101, primitives in an interface to be rendered is grouped to a plurality of primitive groups based on functions corresponding to each primitive of the primitives.

The interface to be rendered consists of a plurality of primitives. For example, primitives can be points, lines, planes, etc. Before rendering the interface to be rendered, the primitives can be grouped according to their functions in the interface to be rendered. Assuming that the interface to be rendered includes a scatter plot, the coordinate axes, coordinate values, and legends of the scatter plot can be rendered synchronously, while scatter points in the scatter plot are rendered asynchronously. This means that primitives corresponding to the coordinate axes, coordinate values, and legends can be grouped together, while the scatter points can be treated as a separate group. Alternatively, different rendering methods can be applied to the scatter points within the plot, that is, scatter points can be further grouped into different primitive groups. For instance, when there are a total of 300 scatter points to be rendered, the first 100 scatter points can be rendered synchronously and grouped together, while the remaining 200 scatter points can be rendered asynchronously and grouped separately.

In S102, rendering flags corresponding to each of the plurality of primitive groups are determined. The rendering flags include a synchronous rendering flag and an asynchronous rendering flag.

According to S101, the primitives can be divided into a plurality of primitive groups according to their functions in the interface to be rendered, and then the rendering flags corresponding to each primitive group can be determined. The rendering flag may be a synchronous rendering flag or an asynchronous rendering flag, and subsequent rendering can be performed according to the rendering flag corresponding to each primitive group.

In S103, rendering is performed based on the rendering flags corresponding to each of the plurality of primitive groups, in which a primitive group with the synchronous rendering flag is rendered by the synchronous rendering process, and a primitive group with the asynchronous rendering flag is rendered by the asynchronous rendering process.

That is, when rendering each primitive group, the primitive groups with the synchronous rendering flag can be rendered by the synchronous rendering process, and the primitive groups with the asynchronous rendering flag can be rendered by the asynchronous rendering process.

Through the above asynchronous rendering method, the primitives of the interface to be rendered can be grouped, and rendering processes, both synchronous and asynchronous, that do not interfere with each other can be utilized to render the primitive groups with corresponding rendering flags, thereby improving the rendering speed and enhancing the user experience.

In an alternative implementation, during performing rendering based on the rendering flags of each primitive group, rendering levels corresponding to each primitive group can also be determined, and then rendering can be performed according to the rendering levels and the rendering flags corresponding to each primitive group. Here, the rendering levels can be used to represent a rendering order of the primitive groups. In the same layer, the lower the rendering level corresponding to the primitive group, the earlier the primitive group is rendered. That is, in a same layer, the lowest-level primitive group is rendered first. Alternatively, a z-index can be assigned to each primitive group to denote its rendering level. The smaller the attribute value of the z-index, the lower the rendering level corresponding to the primitive group, that is, the earlier it is rendered. In addition, for different layers, rendering levels corresponding to each layer can be set. The higher the rendering level corresponding to a layer, the earlier it is rendered.

In implementations, the rendering engine needs to determine the rendering order according to the rendering levels of the primitive groups when rendering the primitive groups; specifically, all the primitive groups are sorted based on the rendering levels corresponding to each primitive group, so as to obtain a plurality of sorted primitive groups; and then, a first primitive group with a lowest rendering level among the plurality of sorted primitive groups is obtained, so as to render the first primitive group with the lowest rendering level first.

In response to the first primitive group including the synchronous rendering flag, the synchronous rendering process of the rendering engine can create a first layer to render the first primitive group. In response to the first primitive group including the asynchronous rendering flag, the asynchronous rendering process of the rendering engine creates a second layer to render the first primitive group. It should be noted that the first layer and the second layer are only used to distinguish between rendering primitive groups with different rendering flags, and the functions of the first layer and the second layer are not limited in any form. The specific implementation of rendering primitive groups by layers is not described herein.

For a second primitive group with a second lowest rendering level among the plurality of sorted primitive groups, in response to the second primitive group including the synchronous rendering flag, the synchronous rendering process renders the second primitive group by using the first layer. It should be noted that if the first primitive group is rendered after the synchronous rendering process creates the first layer, then at this point, the synchronous rendering process does not need to create a new layer, and after the first primitive group is rendered, the second primitive group can be rendered by using the first layer created before. If the first primitive group is rendered after the asynchronous rendering process creates the second layer, then at this point, the synchronous rendering process needs to create a first layer to render the second primitive group, and the synchronous rendering process and the asynchronous rendering process do not affect each other.

In response to the second primitive group including the asynchronous rendering flag, the asynchronous rendering process creates a third layer to render the second primitive group. It should be noted that if the first primitive group is rendered after the synchronous rendering process creates the first layer, then at this point, the asynchronous rendering process needs to create a new layer (namely the third layer) to render the second primitive group. Here, the third layer is equivalent to a first layer created by the asynchronous rendering process. If the first primitive group is rendered after the asynchronous rendering process creates the second layer, then at this point, the asynchronous rendering process needs to create a new layer (the third layer) to render the second primitive group. Here, the third layer is a new layer different from the second layer, that is, a second layer for asynchronous rendering created by the asynchronous rendering process.

Similarly, for a third primitive group with a third lowest rendering level among the plurality of sorted primitive groups, in response to the third primitive group including the synchronous rendering flag, the synchronous rendering process renders the third primitive group by using the first layer. It should be noted that when at least one of the first primitive group and the second primitive group is rendered after the synchronous rendering process creates the first layer, the synchronous rendering process does not need to create a new layer, and the third primitive group can be rendered by using the first layer. When both the first primitive group and the second primitive group are rendered after the asynchronous rendering process creates a new layer, the synchronous rendering process only needs to create a first layer to render the third primitive group. Here, the first layer is a first layer created by the synchronous rendering process. That is to say, in the process of rendering the interface to be rendered, the synchronous rendering process only needs to create one layer for multiple primitive groups including the synchronous rendering flag.

In response to the third primitive group including the asynchronous rendering flag, the asynchronous rendering process creates a fourth layer to render the third primitive group. It should be noted that when both the first primitive group and the second primitive group are rendered after the synchronous rendering process creates the first layer, the fourth layer created by the asynchronous rendering process is a first asynchronous rendering layer. When one of the first primitive group and the second primitive group is rendered after the asynchronous rendering process creates the second layer, the fourth layer created by the asynchronous rendering process is a second asynchronous rendering layer. When both the first primitive group and the second primitive group are rendered by the asynchronous rendering process, the first primitive group and the second primitive group correspond to two different asynchronous rendering layers, and the fourth layer created by the asynchronous rendering process is a third asynchronous rendering layer.

Following the above steps, this process is repeated until all the sorted primitive groups in the interface to be rendered are rendered.

In an alternative implementation, when the rendering engine renders the primitive groups, users may interact with the interface to be rendered, such as clicking buttons and pictures on the interface to be rendered. In response to an operation by a user on a target primitive in the interface to be rendered, a new primitive group corresponding to the target primitive is created. That is, a new primitive group is created for the target primitive which is indicated by the user. Then, the new primitive group is rendered by using the asynchronous rendering process.

Figure 2:
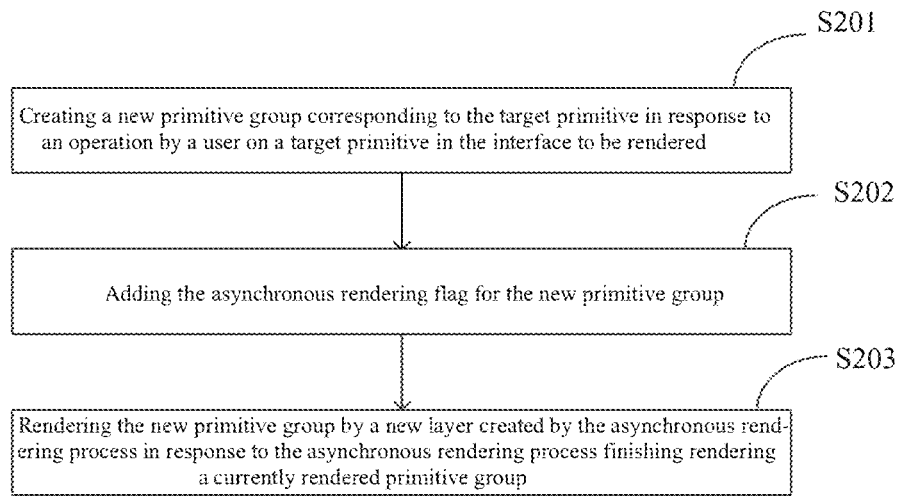
FIG. 2 is a flow diagram of another asynchronous rendering method according to embodiments of the present disclosure.

The specific implementation process is shown in FIG. 2 which is a flow diagram of another asynchronous rendering method according to embodiments of the present disclosure.

In S201, in response to an operation by a user on a target primitive in the interface to be rendered, a new primitive group corresponding to the target primitive is created.

In S202, the asynchronous rendering flag is added for the new primitive group.

In S203, the new primitive group is rendered by a new layer created by the asynchronous rendering process in response to the asynchronous rendering process finishing rendering a currently rendered primitive group.

The asynchronous rendering flag can be added for the newly created primitive group. In response to the asynchronous rendering process finishing rendering a currently rendered primitive group, a new layer is created by the asynchronous rendering process to render the new primitive group. That is, a layer corresponding to the new primitive group can be set to be the highest among the layers corresponding to the primitive group including the asynchronous rendering flag to be rendered, so the asynchronous rendering process renders the new primitive group first, without wait for the completion of rendering all the primitive groups with the asynchronous rendering flag. This enables prompt responsiveness to user interactions with the interface to be rendered, thereby improving the user experience.

In an alternative implementation, in the process of rendering, updating may be performed on the primitives in the interface to be rendered. For example, the terminal can access new data through an API and update some primitives in the interface to be rendered. In response to a primitive updating operation on the interface to be rendered, an updated primitive group corresponding to an updated primitive is created. At this point, it is necessary to wait for the completion of a first time of rendering of the interface to be rendered, i.e., the completion of a full rendering cycle, before rendering the updated primitive group.

In an implementation, after creating the updated primitive group, a rendering flag can be added for the updated primitive group. A corresponding rendering flag can be added according to actual needs. If asynchronous rendering is required for the updated primitive group, the asynchronous rendering flag is added for the updated primitive group, otherwise, the synchronous rendering flag is added for the updated primitive group. In response to the interface to be rendered completing the first time of rendering and the updated primitive group including the synchronous rendering flag, the updated primitive group is rendered by using the synchronous rendering process and the first layer; and in response to the interface to be rendered completing the first time of rendering and the updated primitive group including the asynchronous rendering flag, a new layer is created by using the asynchronous rendering process to render the updated primitive group.

Through the asynchronous rendering method provided by the embodiments of the present disclosure, the primitives of the interface to be rendered can be grouped, and rendering processes, both synchronous and asynchronous, that do not interfere with each other can be utilized to render the primitive groups with corresponding rendering flags, thereby improving the interface rendering speed. When users interact with the interface to be rendered, a new layer can be created for asynchronous rendering, promptly responding to user interactions, thus enhancing the user experience.

Figure 3:
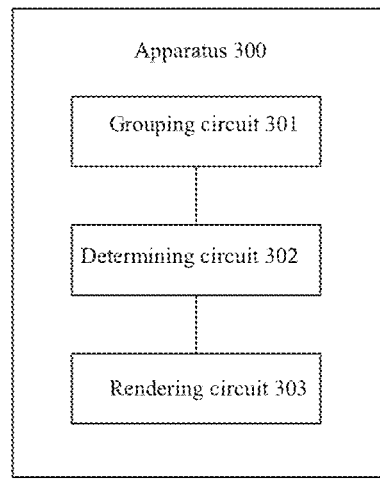
FIG. 3 is a schematic diagram of an asynchronous rendering apparatus according to embodiments of the present disclosure.

The embodiments of the present disclosure also provide an asynchronous rendering apparatus. FIG. 3 is a schematic diagram of an asynchronous rendering apparatus according to embodiments of the present disclosure.

The apparatus 300 includes:
a grouping circuit 301 configured to, group primitives in an interface to be rendered to a plurality of primitive groups based on functions corresponding to each primitive of the primitives;
a determining circuit 302 configured to determine rendering flags corresponding to each of the plurality of primitive groups, wherein the rendering flags include a synchronous rendering flag and an asynchronous rendering flag; and
a rendering circuit 303 configured to perform rendering based on the rendering flags corresponding to each of the plurality of primitive groups, wherein a primitive group with the synchronous rendering flag is rendered by the synchronous rendering process, and a primitive group with the asynchronous rendering flag is rendered by the asynchronous rendering process.

In an alternative implementation, the rendering circuit 303 is configured to: determine rendering levels corresponding to each of the plurality of primitive groups; and preform rendering based on the rendering levels and the rendering flags corresponding to each of the plurality of primitive groups.

In an alternative implementation, the rendering circuit 303 is configured to: sort the plurality of primitive groups based on the rendering levels corresponding to each of the plurality of primitive groups to obtain a plurality of sorted primitive groups; for a first primitive group with a lowest rendering level among the plurality of sorted primitive groups, in response to the first primitive group including the synchronous rendering flag, render the first primitive group by a first layer created by the synchronous rendering process, and in response to the first primitive group including the asynchronous rendering flag, render the first primitive group by a second layer created by the asynchronous rendering process; and for a second primitive group with a second lowest rendering level among the plurality of sorted primitive groups, in response to the second primitive group including the synchronous rendering flag, render the second primitive group by the synchronous rendering process and the first layer, and in response to the second primitive group including the asynchronous rendering flag, render the second primitive group by a third layer created by the asynchronous rendering process; and so on until the plurality of sorted primitive groups are all rendered.

In an alternative implementation, the grouping circuit 301 is further configured to: create a new primitive group corresponding to the target primitive in response to an operation by a user on a target primitive in the interface to be rendered; and
the rendering circuit 303 is configured to: render the new primitive group by the asynchronous rendering process.

In an alternative implementation, the rendering circuit 303 is configured to: add the asynchronous rendering flag for the new primitive group; and render the new primitive group by a new layer created by the asynchronous rendering process in response to the asynchronous rendering process finishing rendering a currently rendered primitive group.

In an alternative implementation, the grouping circuit 301 is further configured to: create an updated primitive group corresponding to an updated primitive in response to a primitive updating operation on the interface to be rendered; and
the rendering circuit 303 is further configured to: render the updated primitive group in response to the interface to be rendered completing a first time of rendering.

In an alternative implementation, the rendering circuit 303 is configured to: add a rendering flag for the updated primitive group; and in response to the interface to be rendered completing the first time of rendering and the updated primitive group including the synchronous rendering flag, render the updated primitive group by the synchronous rendering process and the first layer; and in response to the interface to be rendered completing the first time of rendering and the updated primitive group including the asynchronous rendering flag, render the updated primitive group by a new layer created by the asynchronous rendering process.

The technical effects of the asynchronous rendering apparatus provided by the embodiments of the present disclosure can be found in the above method embodiments, and will not be repeated here.

It should be noted that the specific implementation of each circuit in the embodiments can be found in the relevant description in the above method embodiments. The division of circuits in the embodiments of the present disclosure is schematic, only a logical function division, and there may be other division modes in actual implementations. Each functional circuit in the embodiments of the present disclosure can be integrated into one processing circuit, or each circuit can exist separately physically, or two or more circuits can be integrated into one circuit. For example, in the above embodiments, the determining circuit, grouping circuit and the rendering circuit may be implemented in one circuit or different circuits. The above integrated circuits can be realized in the form of hardware or software functional circuits.

Figure 4:
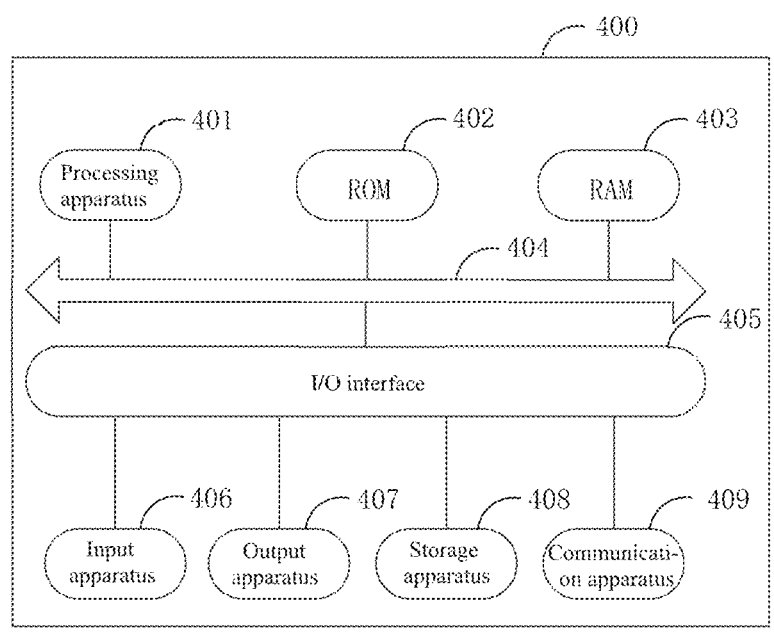
FIG. 4 is a structural diagram of an electronic device according to embodiments of the present disclosure.

Referring to FIG. 4, it is a structural diagram of an electronic device 400 suitable for implementing the embodiments of the present disclosure. The electronic device in the embodiments of the present disclosure may include but not limited to mobile terminals such as mobile phones, notebook computers, digital broadcast receivers, personal digital assistants (PDA), portable android devices (PAD), portable multimedia players (PMP), and vehicle-mounted terminals (such as vehicle-mounted navigation terminals), and fixed terminals such as digital TV and desktop computers. The electronic device shown in FIG. 4 is only an example, and should not impose any limitations on the functionality and scope of use of the embodiments of the present disclosure.

As shown in FIG. 4, the electronic device 400 may include a processing apparatus (such as a central processing unit, and a graphics processor) 401, it may execute various appropriate actions and processes according to a program stored in a read-only memory (ROM) 402 or a program loaded from a storage apparatus 408 to a random-access memory (RAM) 403. In RAM 403, various programs and data required for operations of the electronic device 400 are also stored. The processing apparatus 401, ROM 402, and RAM 403 are connected to each other by a bus 404. An input/output (I/O) interface 405 is also connected to the bus 404.

The following apparatuses may be connected to the I/O interface 405: an input apparatus 406 such as a touch screen, a touchpad, a keyboard, a mouse, a camera, a microphone, an accelerometer, and a gyroscope; an output apparatus 407 such as a liquid crystal display (LCD), a loudspeaker, and a vibrator; a storage apparatus 408 such as a magnetic tape, and a hard disk drive; and a communication apparatus 409. The communication apparatus 409 may allow the electronic device 400 to wireless-communicate or wire-communicate with other devices so as to exchange data. Although FIG. 4 shows the electronic device 400 with various apparatuses, it should be understood that it is not required to implement or possess all the apparatuses shown. Alternatively, it may implement or possess the more or less apparatuses.

According to the embodiments of the present disclosure, the process described above with reference to the flow diagram may be achieved as a computer software program. For example, embodiments of the present disclosure include a computer program product, it includes a computer program loaded on a non-transient computer-readable medium, and the computer program contains a program code for executing the method shown in the flow diagram. In such an embodiment, the computer program may be downloaded and installed from the network by the communication apparatus 409, or installed from the storage apparatus 408, or installed from ROM 402. When the computer program is executed by the processing apparatus 401, the above functions defined in the method in the embodiments of the present disclosure are executed.

The electronic device provided in the embodiments and the method provided in the above embodiments belong to the same inventive concept. Technical details not described here can be found in the above embodiments, and these two can achieve similar technical effects as described above.

The embodiments of the present disclosure provide a computer storage medium, on which a computer program is stored, which, when executed by a processor, implements the method provided in the above embodiments.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random-access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local region network ("LAN"), a wide region network ("WAN"), an internet work (such as the Internet), and an end-to-end network (such as an ad hoc end-to-end network), as well as any currently known or future-developed networks.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to execute the above method.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved circuits described in the embodiments of the present disclosure may be achieved by a mode of software, or may be achieved by a mode of hardware. Herein, the name of the circuit/module does not constitute a limitation for the circuit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

It should be noted that embodiments in the present disclosure are described in a progressive manner, and each embodiment focuses on the differences from other embodiments. The same and similar parts between each embodiment can be referred to each other. For the system or device disclosed in the embodiments, the description is relatively simple as it corresponds to the methods disclosed in the method embodiments. The method embodiments can be referred to for relevant information.

It should be understood that in the present disclosure, "at least one (item)" refers to one or more, and "multiple" refers to two or more. "And/or" is used to describe the association relationship of related objects, indicating that there can be three types of relationships. For example, "A and/or B" can represent: only A exists, only B exists, and A and B exist simultaneously, where A and B can be singular or plural. The character "/" generally indicates that the associated object is an OR relationship. "At least one of the following items" or its similar expression refers to any combination of these items, including any combination of single or complex items. For example, at least one term in a, b, or c can represent: a, b, c, "a and b", "a and c", "b and c", or "a and b and c", where a, b, and c can be singular or plural.

It should also be noted that in the present disclosure, relational terms such as first and second are only used to distinguish one entity or operation from another entity or operation, and do not necessarily require or imply any actual relationship or order between these entities or operations. Moreover, the terms "including", "includes", or any other variation thereof are intended to encompass non-exclusive inclusion, such that a process, method, item, or device that includes a series of elements not only includes those elements, but also includes other elements that are not explicitly listed, or also includes elements inherent to such process, method, item, or device. Without further limitations, the elements limited by the statement "including one . . . " do not exclude the existence of other identical elements in the process, method, item, or device that includes the said elements.

The steps of the method or algorithm described in conjunction with the disclosed embodiments in the present disclosure can be directly implemented using hardware, software modules executed by processors, or a combination of both. Software modules can be placed in random access memory (RAM), memory, read-only memory (ROM), electrically programmable ROM, electrically erasable programmable ROM, registers, hard drives, removable disks, CD-ROM, or any other form of storage medium known in the technical field.

Professionals in the art can implement the solution according to the present disclosure based on the above explanations of the disclosed embodiments. The various modifications to these embodiments will be apparent to professionals in the art, and the general principles defined in the present disclosure can be implemented in other embodiments without departing from the spirit or scope of the present disclosure. Therefore, the present disclosure will not be limited to the embodiments shown herein, but rather to the widest scope consistent with the principles and novel features disclosed herein.

What is claimed is:

1. An asynchronous rendering method, wherein the method is applied to a rendering engine, the rendering engine comprises a synchronous rendering process and an asynchronous rendering process, and the method comprises:
grouping primitives in an interface to be rendered to a plurality of primitive groups based on functions corresponding to each primitive of the primitives;
determining rendering flags corresponding to each of the plurality of primitive groups, wherein the rendering flags comprise a synchronous rendering flag and an asynchronous rendering flag; and performing rendering based on the rendering flags corresponding to each of the plurality of primitive groups, wherein a primitive group with the synchronous rendering flag is rendered by the synchronous rendering process, and a primitive group with the asynchronous rendering flag is rendered by the asynchronous rendering process;

wherein the performing rendering based on the rendering flags corresponding to each of the plurality of primitive groups comprises:

determining rendering levels corresponding to each of the plurality of primitive groups; and performing rendering based on the rendering levels and the rendering flags corresponding to each of the plurality of primitive groups, wherein the performing rendering based on the rendering levels and the rendering flags corresponding to each of the plurality of primitive groups comprises:

sorting the plurality of primitive groups based on the rendering levels corresponding to each of the plurality of primitive groups to obtain a plurality of sorted primitive groups;

for a first primitive group with a lowest rendering level among the plurality of sorted primitive groups, in response to the first primitive group comprising the synchronous rendering flag, rendering the first primitive group by a first layer created by the synchronous rendering process, and in response to the first primitive group comprising the asynchronous rendering flag, rendering the first primitive group by a second layer created by the asynchronous rendering process; and for a second primitive group with a second lowest rendering level among the plurality of sorted primitive groups, in response to the second primitive group comprising the synchronous rendering flag, rendering the second primitive group by the synchronous rendering process and the first layer, and in response to the second primitive group comprising the asynchronous rendering flag, rendering the second primitive group by a third layer created by the asynchronous rendering process; and so on until the plurality of sorted primitive groups are all rendered.

2. The method according to claim 1, further comprising:

creating a new primitive group corresponding to the target primitive in response to an operation by a user on a target primitive in the interface to be rendered; and rendering the new primitive group by the asynchronous rendering process.

3. The method according to claim 2, wherein the rendering the new primitive group by the asynchronous rendering process comprises:

adding the asynchronous rendering flag for the new primitive group; and rendering the new primitive group by a new layer created by the asynchronous rendering process in response to the asynchronous rendering process finishing rendering a currently rendered primitive group.

4. The method according to claim 1, further comprising:

creating an updated primitive group corresponding to an updated primitive in response to a primitive updating operation on the interface to be rendered; and rendering the updated primitive group in response to the interface to be rendered completing a first time of rendering.

5. The method according to claim 4, wherein the rendering the updated primitive group in response to the interface to be rendered completing a first time of rendering comprises:

adding a rendering flag for the updated primitive group; and in response to the interface to be rendered completing the first time of rendering and the updated primitive group comprising the synchronous rendering flag, rendering the updated primitive group by the synchronous rendering process and the first layer; and in response to the interface to be rendered completing the first time of rendering and the updated primitive group comprising the asynchronous rendering flag, rendering the updated primitive group by a new layer created by the asynchronous rendering process.

6. An electronic device, comprising a processor and a non-transitory memory with instructions stored thereon, wherein the instructions upon execution by the processor, cause the processor to:

group primitives in an interface to be rendered to a plurality of primitive groups based on functions corresponding to each primitive of the primitives;

determine rendering flags corresponding to each of the plurality of primitive groups, wherein the rendering flags comprise a synchronous rendering flag and an asynchronous rendering flag; and perform rendering based on the rendering flags corresponding to each of the plurality of primitive groups, wherein a primitive group with the synchronous rendering flag is rendered by a synchronous rendering process of a rendering engine, and a primitive group with the asynchronous rendering flag is rendered by an asynchronous rendering process of the rendering engine;

wherein the processor performing rendering based on the rendering flags corresponding to each of the plurality of primitive groups comprises:

determining rendering levels corresponding to each of the plurality of primitive groups; and performing rendering based on the rendering levels and the rendering flags corresponding to each of the plurality of primitive groups, wherein the processor performing rendering based on the rendering levels and the rendering flags corresponding to each of the plurality of primitive groups comprises:

sorting the plurality of primitive groups based on the rendering levels corresponding to each of the plurality of primitive groups to obtain a plurality of sorted primitive groups;

for a first primitive group with a lowest rendering level among the plurality of sorted primitive groups, in response to the first primitive group comprising the synchronous rendering flag, rendering the first primitive group by a first layer created by the synchronous rendering process, and in response to the first primitive group comprising the asynchronous rendering flag, rendering the first primitive group by a second layer created by the asynchronous rendering process; and for a second primitive group with a second lowest rendering level among the plurality of sorted primitive groups, in response to the second primitive group comprising the synchronous rendering flag, rendering the second primitive group by the synchronous rendering process and the first layer, and in response to the second primitive group comprising the asynchronous rendering flag, rendering the second primitive group by a third layer created by the asynchronous rendering process; and so on until the plurality of sorted primitive groups are all rendered.

7. The electronic device according to claim 6, wherein the instructions further cause the processor to:
create a new primitive group corresponding to the target primitive in response to an operation by a user on a target primitive in the interface to be rendered; and
render the new primitive group by the asynchronous rendering process.

8. The electronic device according to claim 7, wherein the processor rendering the new primitive group by the asynchronous rendering process comprises:
adding the asynchronous rendering flag for the new primitive group; and
rendering the new primitive group by a new layer created by the asynchronous rendering process in response to the asynchronous rendering process finishing rendering a currently rendered primitive group.

9. The electronic device according to claim 6, wherein the instructions further cause the processor to:
create an updated primitive group corresponding to an updated primitive in response to a primitive updating operation on the interface to be rendered; and
render the updated primitive group in response to the interface to be rendered completing a first time of rendering.

10. The electronic device according to claim 9, wherein the processor rendering the updated primitive group in response to the interface to be rendered completing a first time of rendering comprises:
adding a rendering flag for the updated primitive group; and
in response to the interface to be rendered completing the first time of rendering and the updated primitive group comprising the synchronous rendering flag, rendering the updated primitive group by the synchronous rendering process and the first layer; and in response to the interface to be rendered completing the first time of rendering and the updated primitive group comprising the asynchronous rendering flag, rendering the updated primitive group by a new layer created by the asynchronous rendering process.

11. A non-transitory computer-readable storage medium storing instructions that cause a processor to:
group primitives in an interface to be rendered to a plurality of primitive groups based on functions corresponding to each primitive of the primitives;
determine rendering flags corresponding to each of the plurality of primitive groups, wherein the rendering flags comprise a synchronous rendering flag and an asynchronous rendering flag; and
perform rendering based on the rendering flags corresponding to each of the plurality of primitive groups, wherein a primitive group with the synchronous rendering flag is rendered by a synchronous rendering process of a rendering engine, and a primitive group with the asynchronous rendering flag is rendered by an asynchronous rendering process of the rendering engine;
wherein the processor performing rendering based on the rendering flags corresponding to each of the plurality of primitive groups comprises:
determining rendering levels corresponding to each of the plurality of primitive groups; and
performing rendering based on the rendering levels and the rendering flags corresponding to each of the plurality of primitive groups,
wherein the processor performing rendering based on the rendering levels and the rendering flags corresponding to each of the plurality of primitive groups comprises:
sorting the plurality of primitive groups based on the rendering levels corresponding to each of the plurality of primitive groups to obtain a plurality of sorted primitive groups;
for a first primitive group with a lowest rendering level among the plurality of sorted primitive groups, in response to the first primitive group comprising the synchronous rendering flag, rendering the first primitive group by a first layer created by the synchronous rendering process, and in response to the first primitive group comprising the asynchronous rendering flag, rendering the first primitive group by a second layer created by the asynchronous rendering process; and
for a second primitive group with a second lowest rendering level among the plurality of sorted primitive groups, in response to the second primitive group comprising the synchronous rendering flag, rendering the second primitive group by the synchronous rendering process and the first layer, and in response to the second primitive group comprising the asynchronous rendering flag, rendering the second primitive group by a third layer created by the asynchronous rendering process; and so on until the plurality of sorted primitive groups are all rendered.

12. The non-transitory computer-readable storage medium according to claim 11, wherein the instructions further cause the processor to:
create a new primitive group corresponding to the target primitive in response to an operation by a user on a target primitive in the interface to be rendered; and
render the new primitive group by the asynchronous rendering process.

13. The non-transitory computer-readable storage medium according to claim 12, wherein the processor rendering the new primitive group by the asynchronous rendering process comprises:
adding the asynchronous rendering flag for the new primitive group; and
rendering the new primitive group by a new layer created by the asynchronous rendering process in response to the asynchronous rendering process finishing rendering a currently rendered primitive group.

14. The non-transitory computer-readable storage medium according to claim 11, wherein the instructions further cause the processor to:
create an updated primitive group corresponding to an updated primitive in response to a primitive updating operation on the interface to be rendered; and
render the updated primitive group in response to the interface to be rendered completing a first time of rendering.

* * * * *